United States Patent
Qi et al.

(10) Patent No.: US 10,962,383 B2
(45) Date of Patent: Mar. 30, 2021

(54) ROAD CHARACTERIZATION METHOD, METHOD FOR DISPLAYING ROAD INFORMATION AND DEVICES

(71) Applicant: UISEE (SHANGHAI) AUTOMOTIVE TECHNOLOGIES LTD., Shanghai (CN)

(72) Inventors: Xinyu Qi, Shanghai (CN); Xiaocheng Zhou, Shanghai (CN); Yan Jiang, Shanghai (CN); Dan Zhang, Shanghai (CN); Haiyang Zhu, Shanghai (CN)

(73) Assignee: UISEE (SHANGHAI) AUTOMOTIVE TECHNOLOGIES LTD., Shanghai (CN)

( * ) Notice: Subject to any disclaimer, the term of this patent is extended or adjusted under 35 U.S.C. 154(b) by 37 days.

(21) Appl. No.: 16/314,625

(22) PCT Filed: Jul. 6, 2017

(86) PCT No.: PCT/CN2017/091942
§ 371 (c)(1),
(2) Date: Dec. 31, 2018

(87) PCT Pub. No.: WO2019/006722
PCT Pub. Date: Jan. 10, 2019

(65) Prior Publication Data
US 2020/0249048 A1  Aug. 6, 2020

(51) Int. Cl.
*G01C 21/36* (2006.01)
*G08G 1/0967* (2006.01)

(52) U.S. Cl.
CPC ..... *G01C 21/3658* (2013.01); *G01C 21/3676* (2013.01); *G08G 1/0967* (2013.01)

(58) Field of Classification Search
CPC .......................... G01C 21/36; G01C 21/3658; G01C 21/3676; G08G 1/0967
(Continued)

(56) References Cited

U.S. PATENT DOCUMENTS 8,209,123 B2 * 6/2012 Miyazaki ........... G06K 9/00798
                                                     701/532
8,234,064 B2   7/2012 Oonishi et al.
(Continued)

FOREIGN PATENT DOCUMENTS

CN         1576792 A      2/2005
CN       101359434 A      2/2009
(Continued)

OTHER PUBLICATIONS

Ulbrich et al, "Graph-Based Context Representation, Environment Modeling and Information Aggregation for Automated Driving", 2014 IEEE Intelligent Vehichles Symposium Proceedings, IEEE, Jun. 8, 2014, pp. 541-547, XP032620290, DOI: 10.1109/IVS.2014. 6856556.
(Continued)

*Primary Examiner* — Tan Q Nguyen
(74) *Attorney, Agent, or Firm* — MagStone Law LLP (57) ABSTRACT

An objective of the present application is to provide a road characterization method, comprising: acquiring a target road, wherein the target road comprises one or more road segments; determining one or more atomic lanes corresponding to the road segments according to the road segment attribute information of the road segments; and determining lane association information related to the atomic lanes corresponding to the target road; wherein the one or more atomic lanes and the lane association information are used for characterizing the target road. The method can functionally completely describe objective connections of lanes within a target area, including lane connectivity and lane change feasibility.

20 Claims, 7 Drawing Sheets

(58) Field of Classification Search
USPC .......................................................... 701/119
See application file for complete search history.

(56) References Cited

U.S. PATENT DOCUMENTS

| | | | | |
|---|---|---|---|---|
| 8,868,335 | B2* | 10/2014 | Nowak | ................ G01C 15/002 |
| | | | | 701/450 |
| 9,233,688 | B2* | 1/2016 | Clarke | .................... G01S 19/42 |
| 9,816,829 | B2 | 11/2017 | Asano | |
| 2009/0138186 | A1 | 5/2009 | Ray | |
| 2014/0278052 | A1 | 9/2014 | Slavin et al. | |

FOREIGN PATENT DOCUMENTS

| | | |
|---|---|---|
| CN | 101451853 A | 6/2009 |
| CN | 101517369 A | 8/2009 |
| CN | 101636636 A | 1/2010 |
| CN | 101675442 A | 3/2010 |
| CN | 101726308 A | 6/2010 |
| CN | 101929864 A | 12/2010 |
| CN | 102636176 A | 8/2012 |
| CN | 104422457 A | 3/2015 |
| CN | 104422462 A | 3/2015 |
| CN | 104760592 A | 7/2015 |
| CN | 105023434 A | 11/2015 |
| CN | 106918342 A | 7/2017 |
| WO | 2008056881 A1 | 5/2008 |

OTHER PUBLICATIONS

Guo et al. "Automatic Lane-Level Map Generation for Advanced Driver Assitance Systems Using Low-Cost Sensors", 2014 IEEE International Conference on Robotics and Automation (ICRA), IEEE May 31, 2014 , pp. 3975-3982, XP032650189, DOI: 10.1109/ICRA.2014.6907436.
Supplementary European Search Report for European Application No. EP17914119.7 dated Jul. 5, 2019, 8 pages.
PCT, Written Opinion of the International Searching Authority for International Application No. PCT/CN2017/091942 filed Jun. 7, 2017 (Chinese and English translation attached), 7 pages.
PCT, International Search Report for PCT Application No. PCT/CN2017/091942, dated Apr. 12, 2018, 10 pages (NOTE:both Chinese and English versions are provided).

\* cited by examiner

ROAD CHARACTERIZATION METHOD, METHOD FOR DISPLAYING ROAD INFORMATION AND DEVICES

CROSS-REFERENCE TO RELATED APPLICATIONS

This application is a national phase application of International Application No. PCT/CN2017/091942, filed on Jul. 6, 2017, which is hereby incorporated by reference in its entirety.

FIELD OF THE INVENTION

The present application relates to the field of computers, and particularly relates to a road characterization technology and a technology for displaying road information.

BACKGROUND OF THE INVENTION

A self-driving system typically includes a sensing module, a localization module, a planning module, and a control module. The sensing module may acquire a scene where a vehicle is currently located. The localization module may analyze the scene to obtain a current location. The planning module may plan a route according to the current location and a target location. Finally, the control module may issue a vehicle driving instruction.

Figure 1:
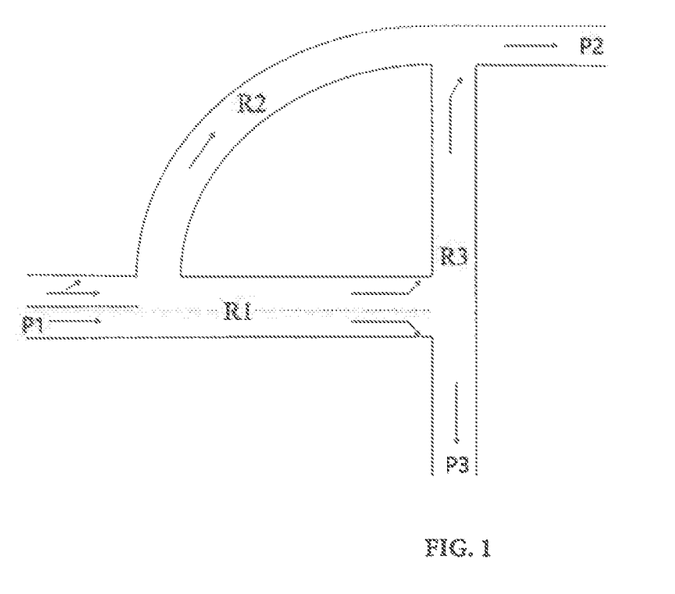
FIG. 1 shows a target road in a typical scenario.
Figure 2:
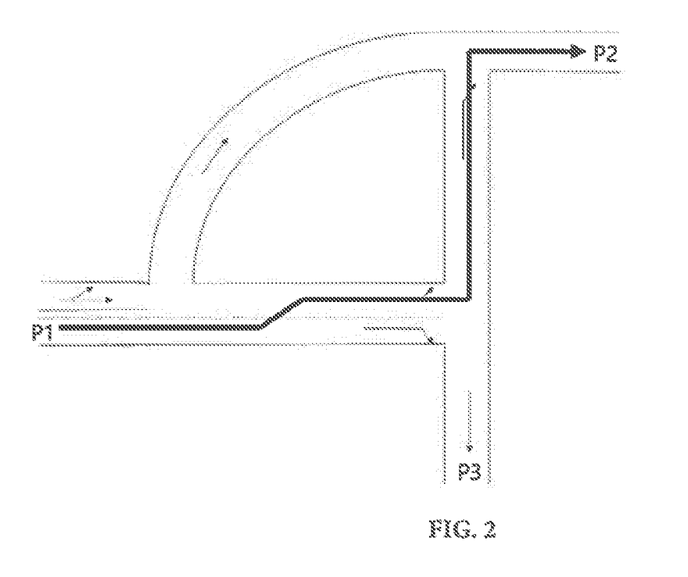
FIG. 2 shows a driving path in the scenario shown in FIG. 1.

To allow the planning module to practically plan an available route from an initial location to a target location, a navigation map describing the lane access in a relevant area is essential. As shown in FIG. 1, to drive the vehicle from a point P1 in the road segment R1 to a point P2 in the road segment R2, the map should provide a description of the line for the scenario. A plain description method includes recording a driving trajectory from the initial location to the target location in advance. Referring to FIG. 2, during operations of the system, the vehicle always runs along this single route.

This single-line description method is simple and convenient but has some obvious drawbacks. For example, 1) only a line with a fixed start point and end point can be described. If the start point or target location is to be changed, the map must be changed. 2) Only one method for traveling from the start point to the end point can be described. If the route is to be changed or a lane change is to be made (or a lane merge, meaning that the vehicle is driven from one lane to another lane), the map must be changed.

SUMMARY OF THE INVENTION

An objective of the present application is to provide a road characterization method.

According to one aspect of the present application, a road characterization method is provided, the method comprising:

acquiring a target road, wherein the target road comprises one or more road segments; determining, according to road segment attribute information of the road segments, one or more atomic lanes corresponding to the one or more road segments; and determining lane association information related to the one or more atomic lanes; wherein the one or more atomic lanes and the lane association information are used for characterizing the target road.

According to another aspect of the present application, a method for displaying road information is provided, the method comprising: displaying road information in an application; wherein the road information comprises one or more atomic lanes and lane association information related to the one or more atomic lanes.

According to one aspect of the present application, a road characterization device is provided, the device comprising: a processor; and a memory arranged to store computer-executable instructions, wherein when the executable instructions are executed, the processor executes the following operations: acquiring a target road, wherein the target road comprises one or more road segments; determining, according to road segment attribute information of the road segments, one or more atomic lanes corresponding to the one or more road segments according to road segment attribute information of the road segments; and determining lane association information related to the one or more atomic lanes; wherein the one or more atomic lanes and the lane association information are used for characterizing the target road.

According to another aspect of the present application, a device for displaying road information is provided, the device comprising: a processor; and a memory arranged to store computer-executable instructions, wherein when the executable instructions are executed, the processor executes the following operation: displaying road information in an application; wherein the road information comprises one or more atomic lanes and lane association information related to the one or more atomic lanes.

According to one aspect of the present application, a computer readable medium comprising instructions is provided, wherein when the instructions are executed, a system performs the following operations: acquiring a target road, wherein the target road comprises one or more road segments; determining, according to road segment attribute information of the road segments, one or more atomic lanes corresponding to the one or more road segments; and determining lane association information related to the one or more atomic lanes; wherein the one or more atomic lanes and the lane association information are used for characterizing the target road.

According to another aspect of the present application, a computer readable medium comprising instructions is provided, wherein when the instructions are executed, a system performs the following operation: displaying road information in an application; wherein the road information comprises one or more atomic lanes and lane association information related to the one or more atomic lanes.

Compared with the existing technologies, the present application segmenting a road and describing road connections based on atomic lanes, therefore completely describing functions of objective connections of lanes in a relevant area, including lane connectivity and lane change feasibility. The route planning algorithm is easy to implement and have high adaptability. The map is not required to be changed when the initial location, the target location, the traveling route or the lane is changed.

BRIEF DESCRIPTION OF THE DRAWINGS

Other features, objectives and advantages of the present application will become more apparent by reading the detailed description of nonrestrictive embodiments made with reference to the following drawings.

The same or similar reference signs in the drawings denote the same or similar components.

DETAILED DESCRIPTION OF EMBODIMENTS

The present application will be further described in detail below in combination with the accompanying drawings.

In a typical configuration of the present application, a terminal, a device of a service network and a trusted party each include one or more central processing units (CPUs), an input/output interface, a network interface, and a memory.

The memory may be a volatile memory, a random access memory (RAM), and/or a non-volatile memory, such as a read-only memory (ROM) or a flash memory (flash RAM), in a computer readable medium. The memory is an example of the computer readable medium.

The computer readable medium, including permanent and non-permanent, mobile and immobile media, can store information by any method or technology. The information may be computer readable instructions, data structures, modules of programs or other data. The examples of storage media for a computer include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a read-only disk read-only memory (CCD-ROM), a digital versatile disc (DVD) or other optical storage, a magnetic cartridge tape, a tape disk storage or other magnetic storage device or any other non-transportable media, which can be used for storing information that can be accessed by a computing device.

The devices of the present application include, but are not limited to, user equipment, network devices, or devices formed by integrating user equipment and network devices through a network. The user equipment includes, but is not limited to, any mobile electronic product that can perform human-computer interaction with a user (e.g., human-computer interaction through a touch pad), e.g., a smartphone, a tablet computer, etc., and the mobile electronic product can adopt any operating system, e.g., an ANDROID operating system, an iOS operating system, etc. The network device includes an electronic device capable of automatically performing numerical calculation and information processing according to the instructions set or stored in advance, and the hardware thereof includes but is not limited to a microprocessor, an application-specific integrated circuit (ASIC), a programmable logic device (PLD), a field programmable gate array (FPGA), a digital signal processor (DSP), an embedded device, etc. The network device includes, but is not limited to, a computer, a network host, a single network server, and a cloud constituted by a plurality of network server sets or a plurality of servers. Here, the cloud is composed of a large number of computers or network servers based on cloud computing. The cloud computing is a kind of distributed computing, and is a virtual supercomputer composed of a group of loosely coupled computers. The network includes, but is not limited to, the Internet, a wide area network, a metropolitan area network, a local area network, a VPN network, a wireless ad hoc network, etc. Preferably, the device may also be a program running on the user equipment, the network device, or the user equipment and the network device, a touch terminal, or the device formed by integrating the network device and the touch terminal through the network.

Of course, those skilled in the art could understand that the above-mentioned device is only exemplary, and other existing or future possible device that may be applicable to the present application shall fall into the scope of the present application and is hereby incorporated by reference.

In the description of the present application, the expression of "a plurality of" means two or more, unless otherwise specified. A road characterization method according to one aspect of the present application will be described in detail below using a road characterization device as an example.

Figure 3:
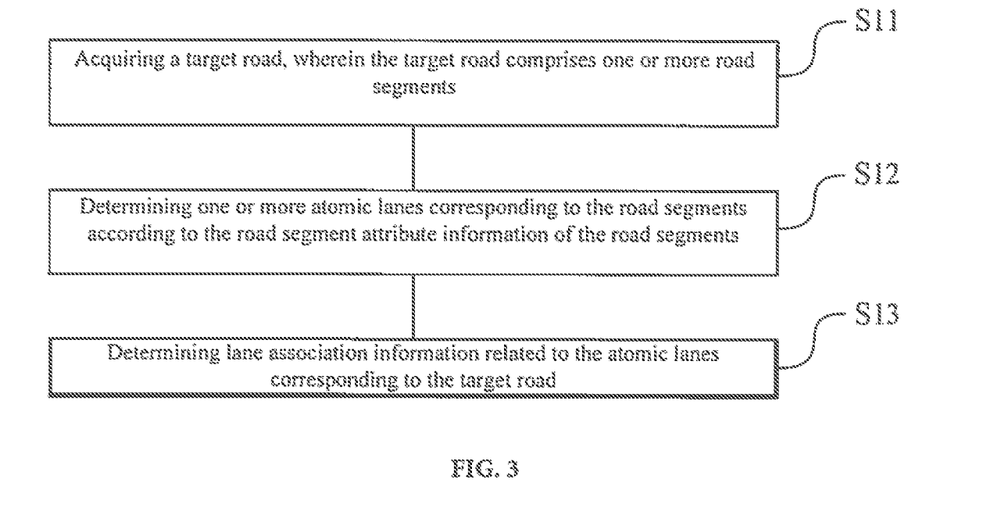
FIG. 3 shows a flow chart of a road characterization method according to an embodiment of the present application.

Referring to FIG. 3, the method may include step S11, step S12, and step S13. In step S11, the road characterization device may acquire a target road, wherein the target road may include one or more road segments. In step S12, the road characterization device may determine one or more atomic lanes corresponding to the road segments according to road segment attribute information of the road segments. In step S13, the road characterization device may determine lane association information related to the atomic lanes corresponding to the target road, wherein the one or more atomic lanes and the lane association information are used for characterizing the target road.

Specifically, in step S11, the road characterization device may acquire a target road, wherein the target road may include one or more road segments. For example, the road characterization device may acquire a road, multiple roads, or all roads in a map as target roads for further processing to obtain a navigation map including lane association information. The target road may include one or more road segments. Each of the road segments may correspond to a continuous road surface for driving vehicles and may include one or more lanes. The lanes between the adjacent road segments may be disconnected. For example, two adjacent road segments may be separated by an intersection.

In step S12, the road characterization device may then determine one or more atomic lanes corresponding to the road segments according to road segment attribute information of the road segments. For example, each of the lanes in each of the road segments may be segmented according to lane change information of the lane until each segment of the lane satisfies that the feasibility of making a lane change from any point on the segment of the lane to an adjacent lane is the same as the feasibility of making a lane change from the adjacent lane to any point on the segment of lane. Such a segment of the lane is referred to as an "atomic lane." The road segment attribute information of the road segments may include lane change information of the lanes. As another example, when one lane L1 (not shown) intersects another lane L2 (not shown), lane L1 may be divided into a lane segment L1a (not shown) and a lane segment L1b (not shown) at an intersection. A vehicle can be driven from the lane L2 to the lane segment L1b. When atomic lanes are divided, lane L1 is segmented at the intersection between the lane L2 and the lane L1. As a further example, on the basis of the above, each lane may be segmented according to a speed limit or traffic control information of the lane until each segment of lane satisfies: the speed limit or traffic control information of any two points on the segment of lane is identical. The road segment attribute information of the road segments may also include speed limit or traffic control information of the lanes. Similarly, the road segment attribute information of the road segments may also include other road information according to actual conditions, and details are not described herein again, but are hereby incorporated by reference.

The "atomic lane" satisfies atomicity, that is, 1) the lane change activity between adjacent atomic lanes is consistent everywhere, i.e., a lane change can be made from any location on a segment of an atomic lane to the same adjacent atomic lane or back from the same adjacent atomic lane to the atomic lane, or a lane change cannot be made from any location of the atomic lane to the same adjacent atomic lane or back from the same adjacent atomic lane; and 2) an end point of an atomic lane can be connected to one or more start points of one or more other atomic lanes, and a start point of the atomic lane can also be connected to one or more end points of one or more other atomic lanes. When a vehicle is automatically driven in an atomic lane, it is driven along the atomic lane from the start point of the atomic lane to the end point of the atomic lane except for lane changes.

Preferably, each atomic lane may have a unique start point and a unique end point. For example, when a lane in a road segment is divided into atomic lanes, if the lane is connected to a ramp or an intersection and a vehicle can exit the lane from the ramp or enter another lane from the intersection, the lane may be divided at a junction between the lane and the ramp or a junction between the lane and the intersection. As another example, if a vehicle can enter a lane that needs to be divided into atomic lanes from an intersection or ramp, the lane may be divided at a junction between the intersection and the land or a junction between the ramp and the lane. When a vehicle is driven on an atomic lane, it can only be driven from the unique start point of the atomic lane to the unique end point of the atomic lane, except entering another atomic lane by making a lane change. The feasibility of driving along the lane can be clearly described by ensuring that the atomic lane has only a unique start point and a unique end point.

Then, in step S13, the road characterization device may determine lane association information related to the atomic lanes corresponding to the target road. The atomic lanes and the lane association information may be used to characterize the target road. For example, based on connection information between two atomic lanes in the same lane that are physically connected, the lane association information related to the two atomic lanes may be determined as interconnection. That is, a vehicle can be driven from one atomic lane of the two atomic lanes to the other atomic lane of the two atomic lanes. Or in combination with a driving direction of the lane, the lane association information related to the two atomic lanes may be determined as unidirectional connection, where a connection direction is consistent with the driving direction of the lane. As another example, when one lane L1 (not shown) intersects another lane L2 (not shown), lane L1 may be divided into a lane segment L1a (not shown) and a lane segment L1b (not shown) at an intersection, a vehicle can be driven from lane L2 to lane segment L1b. As such, lane L1 may be segmented at the intersection between lane L2 and lane L1 during the division of atomic lanes. If lane L2 and lane segment L1b are already atomic lanes, the lane association information related to the atomic lane L2 and the atomic lane L1b may be a unidirectional connection, wherein the connection direction is from atomic lane L2 to atomic lane L1b. As a further example, based on information about lane changes between two parallel and adjacent atomic lanes, lane association information related to the two atomic lanes may be determined as a corresponding lane change relation. For example, a lane change can be made between the two atomic lanes, the lane association information related to them is interconnection. That is, a vehicle can be driven from one atomic lane of the two atomic lanes to the other atomic lane of the two atomic lanes. Alternatively, a lane change can be made only from one of the two atomic lanes to the other atomic lane of the atomic lanes based on traffic laws, then the lane association information related to them is a unidirectional connection, wherein the connection direction is consistent with the permitted lane change direction.

For example, a computer may first acquire the road information as shown in FIG. 1, and identify a road therein as a target road, including a road segment R1, a road segment R2, and a road segment R3, wherein traveling directions of a respective road segment of the road segments are marked in the figure. The road segment R1 and the road segment R2, the road segment R2 and the road segment R3, the road segment R1 and the road segment R3, may be intersected, respectively. The road segment R1 may include two lanes. A lane change can be made between the two lanes unidirectionally only (can only be made from one side of the dotted line to one side of the solid line) in the front half of the road segment R1 but can be made bidirectionally in the rear half of the road segment R1. Each of the road segment R2 and the road segment R3 may include only one lane, and a driving direction of the road segment R3 is changed at the intersection between the road segment R1 and the road segment R3.

Figure 4:
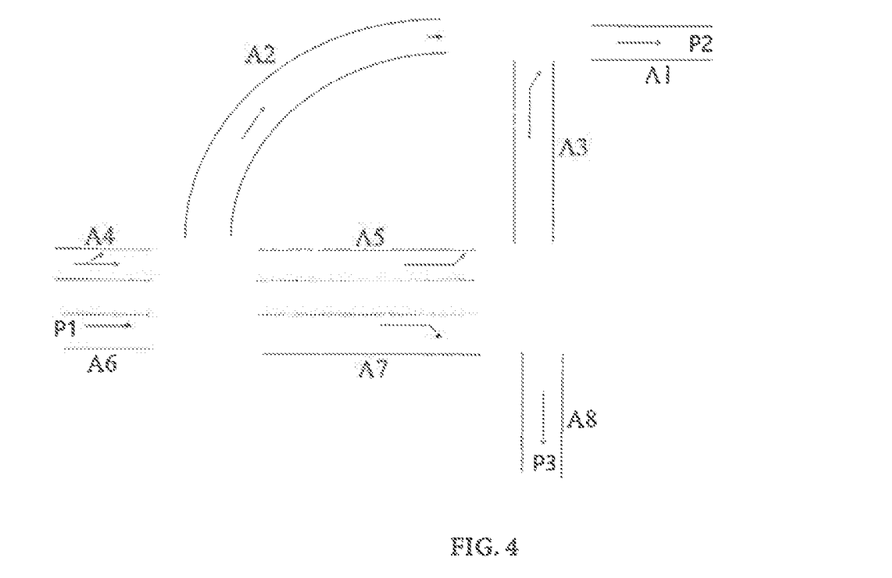
FIG. 4 is a schematic diagram of atomic lane division of the target road in FIG. 1.

Subsequently, the computer may segment the lanes in the respective road segments according to an intersection relationship between a lane of the road segment R1 and a lane of the road segment R2, an intersection relationship between the lane of the road segment R2 and the road segment R3, an intersection relationship between the lanes in the road segment R1 and the road segment R3, and a change in the lane change relation of the two lanes in the road segment R1 (the change from unidirectional lane change to bidirectional lane change). The segmentation result is shown in FIG. 4. The road segment R1 may be divided into an atomic lane A4, an atomic lane A5, an atomic lane A6, and an atomic lane A7. The road segment R2 may be divided into an atomic lane A1 and an atomic lane A2. And the road segment R3 may be divided into an atomic lane A3 and an atomic lane A8. In the road segment R1, a lane change can be made from the atomic lane A6 to the atomic lane A4. A lane change cannot be made from the atomic lane A4 to the atomic lane A6. A lane change can be made between the atomic lane A5 and the atomic lane A7. The change in the lane change relation of the two lanes in the road segment R1 occurs and the intersection between the road segment R1 and the road segment R2 occur at the same location. As a result, only each of the two lanes of the road segment R1 is divided into two segments. If the change of the lane change relation and the intersection between the road segments occur at different locations, it is necessary to continue to segment the corresponding lanes according to actual situations. The division of the atomic lanes can be carried out step by step and verified. If the current target road still has lane segments that do not comply with the atomicity after each lane is segmented, the current target road is continuously divided until all the lane segments satisfy the atomicity.

Next, the computer may determine lane association information related to the atomic lanes. The atomic lane A4 is physically connected to the atomic lane A5, and a vehicle can be driven from the atomic lane A4 to the atomic lane A5. Accordingly, the lane association information related to the atomic lane A4 and the atomic lane A5 may include that the atomic lane A4 is unidirectionally connected to the atomic lane A5 (e.g., an end point of the atomic lane A4 being connected to a start point of the atomic lane A5), that the atomic lane A6 is unidirectionally connected to the atomic lane A7, and that the atomic lane A2 is unidirectionally connected to the atomic lane A1. In addition, the vehicle may be driven from the atomic lane A4 to the atomic lane A2, so the atomic lane A4 is unidirectionally connected to the atomic lane A2. Similarly, the atomic lane A3 is unidirectionally connected to the atomic lane A1. The atomic lane A5 is unidirectionally connected to the atomic lane A3. And the atomic lane A7 is unidirectionally connected to atomic lane A8. Moreover, the vehicle can only be driven from the atomic lane A6 to the atomic lane A4 but cannot be driven from the atomic lane A4 to the atomic lane A6. As a result, the atomic lane A6 is unidirectionally connected to the atomic lane A4. On the other hand, the vehicle can travel freely between the atomic lane A5 and the atomic lane A7, so the lane association information related to the atomic lane A5 and the atomic lane A7 may include that the atomic lane A5 and the atomic lane A7 are bidirectionally connected to each other. For example, the lane association information may include that the vehicle can be driven from the atomic lane A5 to the atomic lane A7, and that the vehicle can be driven from the atomic lane A7 to the atomic lane A5.

So far, the target road shown in FIG. 1 can be characterized according to the atomic lanes A1-A8 and the lane association information related to the atomic lanes. The computer can determine the connectivity of the corresponding locations except the lanes and the feasibility of lane changes in the target road according to the respective atomic lanes and the lane association information.

The road characterization device may be a computing device, e.g., a mobile phone, a tablet computer, a vehicle navigation device, a PDA, a personal computer, a network server, a cloud, etc., and may include a processor and a memory, wherein the memory stores computer-executable instructions, and the processor may implement the road characterization method described above when the executable instructions are executed. Of course, those skilled in the art could understand that the above-mentioned device is only exemplary, and other existing or future possible computing device that may be applicable to the present application shall fall into the scope of the present application and is hereby incorporated by reference. For example, the road characterization device may be a mobile terminal, such as a vehicle navigation device or a mobile phone or a tablet computer held by a passenger in the vehicle. When executing the above road characterization method, the mobile terminal may first acquire a target road, wherein the target road may include one or more road segments. The mobile terminal may then determine one or more atomic lanes corresponding to the road segments according to the road segment attribute information of the road segments. Next, the mobile terminal may determine lane association information related to the atomic lanes corresponding to the target road, wherein the one or more atomic lanes and the lane association information may be used to characterize the target road. As another example, the road characterization device may be a network server that executes the road characterization method described above. And the execution process may be the same as the process that the mobile terminal executes the method, which is not described here to avoid redundancy and is hereby incorporated by reference.

Figure 5:
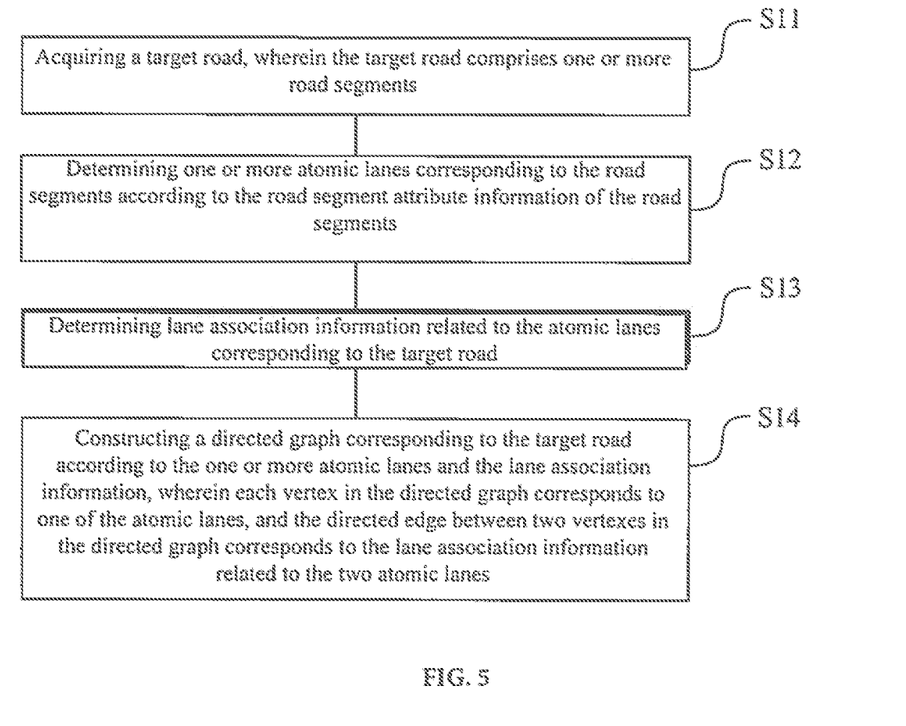
FIG. 5 shows a flow chart of a road characterization method according to another embodiment of the present application.

Preferably, referring to FIG. 5, the method may further include step S14. In step S14, a directed graph corresponding to the target road may be constructed according to the one or more atomic lanes and the lane association information, wherein each vertex in the directed graph may correspond to one of the atomic lanes and wherein a directed edge between two vertexes in the directed graph may correspond to the lane association information related to the two atomic lanes. For example, after the target road is divided into atomic lanes and lane association information of the atomic lanes is determined, the atomic lanes and the lane association information related to the atomic lanes are recorded using the directed graph, wherein each of the atomic lanes may correspond to a vertex of the directed graph, and wherein the respective lane association information related to each of the atomic lanes may correspond to a respective directed edge of directed edges between the vertexes of the directed graph.

Figure 6:
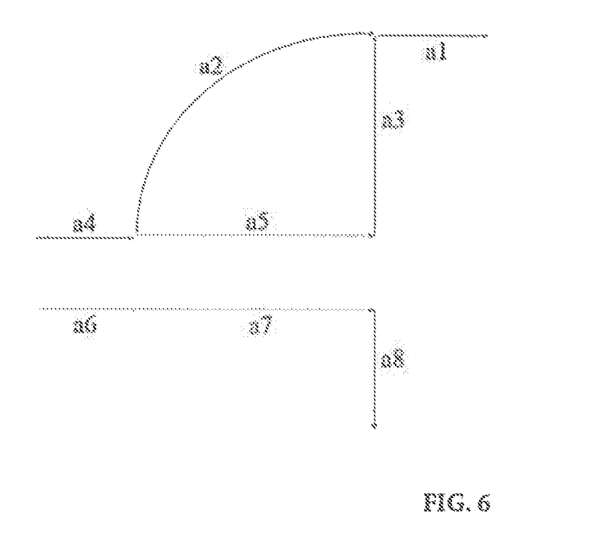
FIG. 6 shows a directed line segment corresponding to the atomic lanes in FIG. 4.

For example, referring to FIG. 6, the atomic lanes A1-A8 in FIG. 4 may be represented by directed line segments a1-a8, respectively. The original appearance of a lane can be restored by a lane centerline and lane width information. The lane centerline can reflect a direction of the lane. Thus, in some embodiments, a directed line segment may match the centerline of an atomic lane to reflect the direction and driving direction of the atomic lane. If necessary, the atomic lane can be further described using the corresponding lane width information. The directed line segment may be a straight line or a curve, and the length may vary according to actual situations of the road. The directed line segment may have directivity, wherein the direction of the line segment may be from the start point of the line segment to the end point of the line segment, and the tangential direction of any point on the line segment corresponds to a driving direction of the vehicle at the location.

The centerline of each atomic lane in FIG. 4 may be determined first. The directed line segment corresponding to each atomic lane may then be determined according to the vehicle driving direction provided by each atomic lane. The determination of the directed line segment can be completed by a computer or manually. The directed line segments corresponding to the naturally connected atomic lanes may also be connected. For example, the atomic lane A2, the atomic lane A4, and the atomic lane A5 may correspond to the atomic line segment a2, the atomic line segment a4, and the atomic line segment a5, respectively. A vehicle can be naturally driven from the atomic lane A4 to the atomic lane A5, and an end point of the directed line segment a4 is connected to a start point of the directed line segment a5. The vehicle can be turned and then driven to the atomic lane A2 from the atomic lane A4, and the end point of the directed line segment a4 is also connected to the start point of the directed line segment a2. The cases in which the start points or end points of other directed line segments in FIG. 6 are connected are analogous and will not be described again. It should also be noted that since the vehicle can be unidirectionally driven from the atomic lane A6 to the atomic lane A4 and bidirectionally driven between the atomic lane A5 and the atomic lane A7, the lane change information may be recorded respectively.

Figure 7:
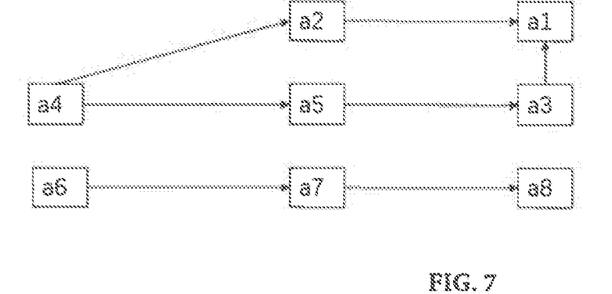
FIG. 7 shows a directed graph for expressing the connectivity of the atomic lanes in FIG. 4.

Subsequently, the computer may mark each directed line segment in FIG. 6 as a vertex, construct an empty graph with the vertexes, and use the connection relations of the directed line segments as directed edges between the vertexes to construct a directed graph, wherein the directions of the directed edges may coincide with specified vehicle driving directions. Referring to FIG. 7, the directed line segments a1-a8 in FIG. 6 are marked as corresponding vertexes, respectively, and the directed edges between the corresponding vertexes are added according to the connection relations of the directed line segments in FIG. 6. For example, an end point of the directed line segment a4 is connected to a start point of the line segment a2 and the specified vehicle driving direction is also from the atomic lane represented by the directed line segment a4 to the atomic lane represented by the directed line segment a2. Thus, a directed edge is present between the vertex a4 and the vertex a2 of the graph, and the direction of the directed edge is from the vertex a4 to the vertex a2. By traversing the directed line segments in FIG. 6, the corresponding directed edges are added according to the connection relations between each directed line segment and other directed line segments to construct a graph shown in FIG. 7. Since the connection relations of the directed line segments reflect the natural connection relations between the atomic lanes and the directed edges of the graph in FIG. 7 are determined according to the connection relations of the directed line segments, the directed edges of the graph in FIG. 7 also reflect the natural connection relations between the atomic lanes.

Figure 8:
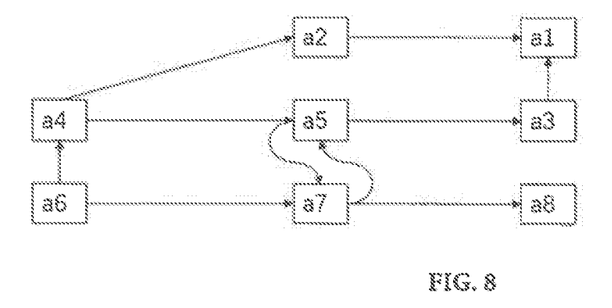
FIG. 8 shows a directed graph for expressing the connectivity of the atomic lanes in FIG. 4 and the lane change feasibility.

Next, based on the graph in FIG. 7, the directed edges between the related vertexes are added according to the recorded lane change information related to the atomic lanes. For example, the vehicle can be unidirectionally driven from the atomic lane A6 to the atomic lane A4. The atomic lane A6 may correspond to the vertex a6, and the atomic lane A4 corresponds to the vertex a4. A directed edge may thus be added between the vertex a6 and the vertex a4, wherein a direction of the directed edge may be from the vertex a6 to the vertex a4. As another example, the vehicle can be bidirectionally driven between the atomic lane A5 and the atomic lane A7. The atomic lane A5 corresponds to the vertex a5, and the atomic lane A7 corresponds to the vertex a7. Two directed edges may thus be added between the vertex a5 and the vertex a7, wherein directions of the directed edges are from the vertex a5 to the vertex a7 and from the vertex a7 to the vertex a5, respectively. The directed graph constructed after the lane change information of each atomic lane is traversed and the directed edges are added according to the lane change information is shown in FIG. 8. Since the newly added directed edges in FIG. 8 relative to FIG. 7 are determined according to the lane change information related to the atomic lanes, the newly added directed edges also reflect the lane change relations between the atomic lanes.

So far, the lane association information related to the atomic lanes corresponds to the directed edges of the directed graph shown in FIG. 8, wherein the lane association information includes natural connectivity information between the atomic lanes and lane change relation information related to the atomic lanes.

On the other hand, a location and a direction of a lane can be reflected by the location and direction of lane lines on two sides of the lane. Thus, in other embodiments, two directed line segments may be used to match the lane lines on the two sides of an atomic lane. Each of the directed line segments can reflect the direction and the driving direction of the atomic lane. The directed line segments may be marked as vertexes of a directed graph. The connection relations and lane change information related to the atomic lanes may be marked as directed edges of the directed graph. The atomic lanes and the lane association information related to them can be characterized by the directed graph. The process is similar to the above scheme of using the directed line segments to match the centerlines of the atomic lanes, which is not redundantly described here and is hereby incorporated by reference.

Preferably, in step S13, the road characterization device may determine lane association information related to the atomic lanes corresponding to the target road according to a preset lane association rule. For example, according to the preset lane association rule, a vehicle can be driven from one atomic lane to the other atomic lane, and lane association information exists between the two atomic lanes. The lane association rule can be determined according to the actual connection relation of the atomic lanes, or in conjunction with traffic rules.

Preferably, the lane association rule may include at least one of the following: 1) if a first atomic lane and a second atomic lane of the atomic lanes corresponding to the target road belong to the same road segment, and a lane change can be made from the first atomic lane to the second atomic lane, the lane association information related to the first atomic lane and the second atomic lane is determined to include that the first atomic lane can be changed to the second atomic lane; 2) if a third atomic lane and a fourth atomic lane in the atomic lanes corresponding to the target road belong to adjacent road segments, and a vehicle can be driven from the third atomic lane to the fourth atomic lane, the lane association information related to the third atomic lane and the fourth atomic lane is determined to include that an end point of the third atomic lane is connected to a start point of the fourth atomic lane; and 3) if a fifth atomic lane and a sixth atomic lane in the atomic lanes corresponding to the target road belong to the same road segment, and an end point of the fifth atomic lane coincides with a start point of the sixth atomic lane, the lane association information related to the fifth atomic lane and the sixth atomic lane is determined to include that the end point of the fifth atomic lane is connected to the start point of the sixth atomic lane.

For example, referring to FIGS. 1 and 4, the road segment R1 corresponds to a continuous road including two continuous and parallel lanes, where the atomic lane A4 and the atomic lane A5 belong to one of the lanes, and the atomic lane A6 and the atomic lane A7 belong to the other lane. A lane change can be made from the atomic lane A6 to the atomic lane A4. The atomic lane A6 and the atomic lane A4 belong to the road segment R1. Therefore the lane association information related to the atomic lane A6 and the atomic lane A4 may include that a lane change can be made from the atomic lane A6 to the atomic lane A4.

Figure 9:
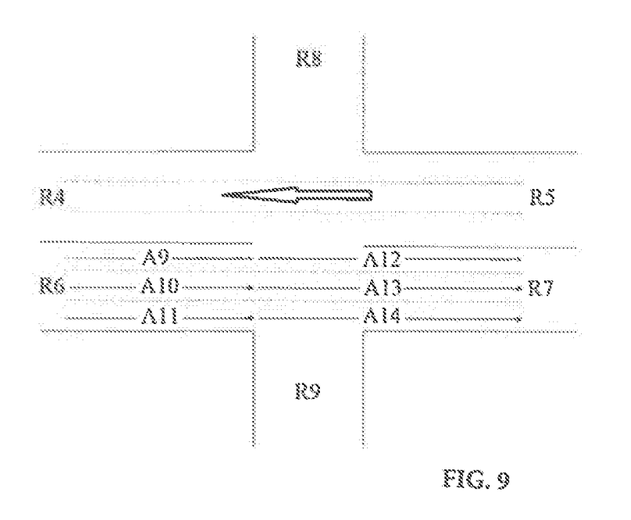
FIGS. 9 and 10 are schematic diagrams of atomic lane division of a target road in other scenarios respectively.

As another example, referring to FIG. 9, the horizontal crossroad may be divided into a road segment R4, a road segment R5, a road segment R6, a road segment R7, a road segment R8, and a road segment R9 by an intersection, wherein a vehicle can be driven from the road segment R5 to the road segment R4, or from the road segment R6 to the road segment R7. The road segment R6 and the road segment R7 are adjacent road segments, each of which includes three lanes. After the division of the atomic lanes, the atomic lanes of the road segment R6 near the intersection are atomic lane A9, atomic lane A10, and atomic lane A11, respectively. The atomic lanes of the road segment R7 near the intersection are atomic lane A12, atomic lane A13, and atomic lane A14, respectively. A vehicle can be driven from the atomic lane A9 to the atomic lane A12, and the lane association information related to the atomic lane A9 and the atomic lane A12 may include: an end point of the atomic lane A9 is connected to a start point of the atomic lane A12, and so on. The lane association information related to the atomic lane A10 and the atomic lane A13 may include: the end point of the atomic lane A10 is connected to the start point of the atomic lane A13. And the lane association information related to the atomic lane A11 and the atomic lane A14 may include: an end point of the atomic lane A11 is connected to a start point of the atomic lane A14. If the vehicle can also be driven from the atomic lane A9 to the atomic lane A13, the lane association information related to the atomic lane A9 and the atomic lane A13 may include: an end point of the atomic lane A9 is connected to a start point of the atomic lane A13. The lane association information related to the other atomic lanes can be deduced by analogy and will not be described.

As another example, still referring to FIG. 1 and FIG. 4, the atomic lane A4 and the atomic lane A5 belong to the same road segment R1. And since the lanes are continuous, the end point of the atomic lane A4 coincides with the start point of the atomic lane A5. As such, the lane association information related to the atomic lane A4 and the atomic lane A5 may include that the end point of the atomic lane A4 is connected to the start point of the atomic lane A5. Similarly, the lane association information related to the atomic lane A6, and the atomic lane A7 may include that the end point of the atomic lane A6 is connected to the start point of the atomic lane A7.

Figure 10:
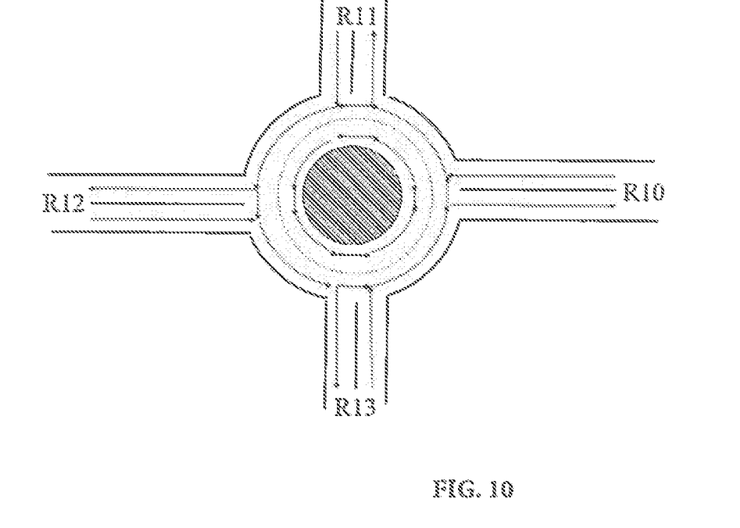

In particular, referring to FIG. 10, the target road may include a roundabout. The roundabout may have four entrances and exits and may include two closed circular lanes. The entrances and exits of the roundabout are connected to the road segment R10, the road segment R11, the road segment R12, and the road segment R13, respectively. The atomic lanes in the road segment R10, the road segment R11, the road segment R12 and the road segment R13 are determined as described above. The circular lanes in the roundabout are cut by the extension lines or reverse extension lines of the atomic lanes in the nearest entrance and exit road segments to form atomic lanes, and the atomic lanes in the roundabout and at the entrances and exits of the roundabout are shown in FIG. 10.

It would be understood by those skilled in the art that the above-described method for characterizing atomic lanes and lane change information related to them based on a directed graph is a preferred embodiment of the present application, and is merely an example but not a limitation. For example, in some embodiments, the method for characterizing atomic lanes and lane change information related to them may also include marking an end point of a directed line segment as a vertex of a directed graph or marking an end point of a directed line segment as a start point or an end point of an atomic channel, and expressing the connection relations between the directed line segments and the directions of the directed line segments themselves through directed edges of the directed graph, thereby characterizing the natural connection relation of the target road through the directed graph. While the lane change relations between the atomic lanes are recorded separately as the lane association information, thereby realizing the purpose of characterizing the atomic lanes and the lane change information related to them based on the directed graph. As another example, in some embodiments, the lane change information related to the atomic lanes is still characterized by the directed edges of the directed graph, e.g., a directed edge is from a vertex of the directed graph corresponding to the start point of one directed line segment to a vertex of the directed graph corresponding to the end point of the other directed line segment.

Preferably, each point on each atomic lane has the same lane change activity. For example, referring to FIG. 1 and FIG. 4, the road segment R1 includes two lanes. A lane change can only be made between the two lanes unidirectionally in the front half of the road segment R1 (only be changed from one side of the dotted line to one side of the solid line), but lance changes can be made bidirectionally in the rear half.

According to the feasibility of lane changes, the two lanes of the road segment R1 are respectively divided into atomic lanes at the location where the lane change feasibility occurs to obtain the atomic lane A4, the atomic lane A5, the atomic lane A6 and the atomic lane A7, wherein a lane change cannot be made from any point on the atomic lane A4 to other lanes, wherein a lane change can be made from any point on the atomic lane A5 to the atomic lane A7, wherein a lane change can be made from any point on the atomic lane A6 to the atomic lane A4, and wherein a lane change can be made from any point on the atomic lane A7 to the atomic lane A5.

Each point on the atomic lanes is ensured to have the same lane change activity, which can clearly describe the feasibility of lane changes.

Figure 11:
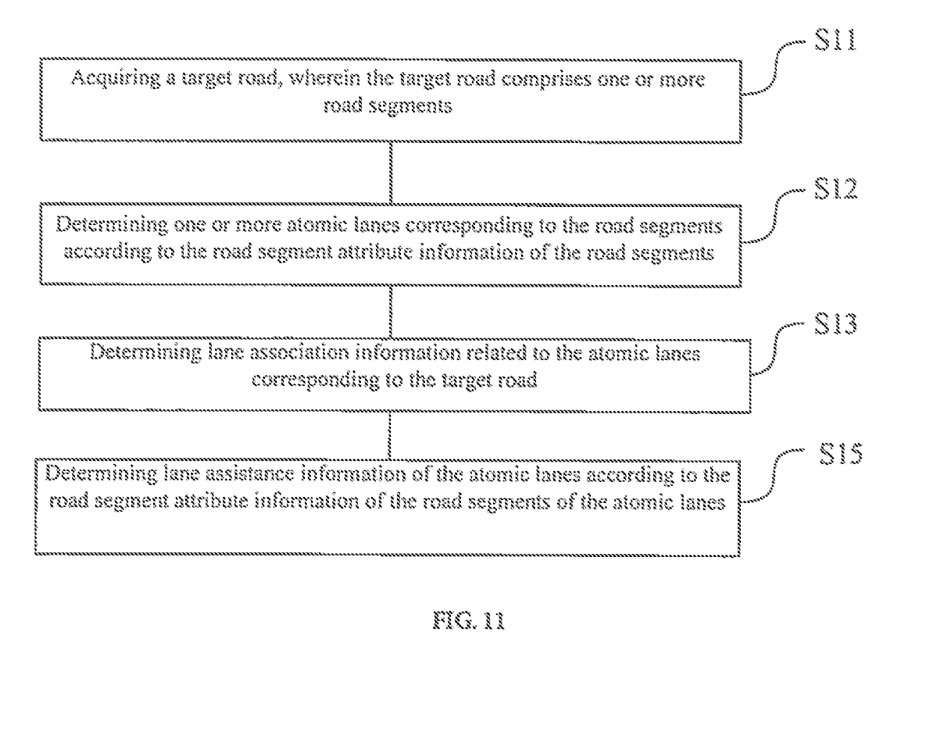
FIG. 11 shows a block diagram of a road characterization device according to an embodiment of the present application.

Preferably, referring to FIG. 11, the method further includes step S15. In step S15, the road characterization device may determine, according to the road segment attribute information of the road segments of the atomic lanes, lane assistance information related to the atomic lanes. The lane assistance information provides additional information about the corresponding atomic lanes to facilitate more accurate behavior determination and vehicle control of system modules, e.g., in the cases where an unmanned vehicle is driven on the atomic lanes.

For example, when the computer divides the target road into atomic lanes, it may add additional information to the attribute information of the atomic lanes, such as speed limit information, path curvature information of the atomic lanes, localization weight information used for achieving more precise localization in the presence of multiple localization sources, mandatory behavior information and way giving information stipulated by traffic rules, road material information, environmental information of lanes, etc., thereby guiding the driving behaviors of drivers or unmanned driving behaviors of unmanned vehicles, improving the navigation accuracy and improving the driving or riding experience. The localization source is a device module for providing vehicle localization information, and is usually determined by a localization device (e.g., a GPS receiver, a camera or a laser radar, etc.) and a localization algorithm based on the localization device (e.g., various camera-based visual localization algorithms, such as SLAM (Simultaneous Localization and Mapping). The accuracy (or credibility) of the localization source corresponding to the atomic lane is represented by localization weight information. The localization weight of the localization source is higher if the accuracy is higher, and correspondingly, the localization information thereof is more accepted by an unmanned system, so that the navigation accuracy is improved.

As another example, each atomic lane may be represented by a directed line segment. The computer may first determine the centerline of each atomic lane and may then determine a directed line segment corresponding to each atomic lane according to the vehicle driving direction specified by each atomic lane. The computer can also describe the atomic lane in combination with the lane width information of the atomic lane. The computer may add additional information such as speed limit information, path curvature information, and localization weight information to the attribute information of the directed line segment corresponding to the atomic lane. As another example, each atomic lane in the target road may be represented as a vertex in the directed graph. The lane association information related to the atomic lanes may be represented by a directed edge. The computer may add additional information such as speed limit information, path curvature information, and localization weight information to the attribute information of the vertex of the directed graph corresponding to the atomic lane.

Preferably, the lane assistance information may include at least one of the following: speed limit information of the atomic lane, traffic control information of the atomic lane, curvature information of the atomic lane, road surface information of the atomic lane, and environmental information of the atomic lane.

For example, the speed limit information of the atomic lane may provide a speed limit when vehicles pass the atomic lane. The traffic control information may provide whether the atomic lane is accessible at a specific time and/or for particular vehicles. The curvature information of the atomic lane may be used for providing a turning radius of a curve, so that a vehicle control module of an unmanned vehicle sets a front wheel deflection angle to prevent the front wheel from shaking during turning to improve the riding experience of the vehicle. The road surface information of the atomic lane may provide road surface material information, e.g., asphalt pavement, concrete pavement, mud pavement or gravel pavement. The appropriate driving speed can be further determined according to the road surface material type information. The environmental information of the atomic lane may provide that the road of the lane is a highway, a city highway, a tunnel, a bridge, etc., and can be used to determine the appropriate driving mode, driving style, etc. and to control vehicle light and the like. For example, the high beam can be used continuously on the highway, but cannot be used continuously on the city road.

Preferably, the target road includes at least one of the following: a plurality of roads within a target area, a planned path output by a planning application, and a driving path set by a user.

For example, the computer may read and analyze all lanes within the selected target area and may divide the lanes into atomic lanes. As another example, the computer may read a planned path output by a path planning application, wherein the planned path connects the start point and the end point on the map; and the computer divides the lanes involved in the planned path into atomic lanes. As another example, the computer may acquire a driving path set by a user on a map and may divide the lanes involved in the driving path into atomic lanes.

Figure 12:
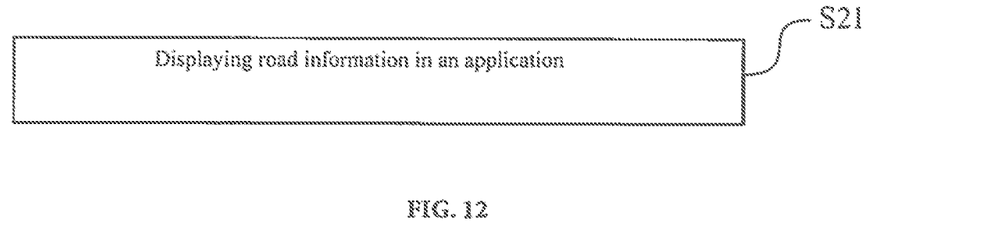
FIGS. 12 and 13 show flowcharts illustrating methods for displaying road information according to some embodiments of the present application.

According to another aspect of the present application, a method for displaying road information is provided. Referring to FIG. 12, the method may include step S21. In step S21, a road information displaying device may display road information in an application, wherein the road information may include one or more atomic lanes and lane association information related to the one or more atomic lanes. The atomic lanes and the lane association information are used for characterizing a target road. The road information displayed by the road information displaying device may be road information of a road corresponding to a specified path (e.g., a planned path of a navigation application or a user-specified path), or road information of some or all roads in a target area.

For example, the vehicle navigation device of an unmanned vehicle has a liquid crystal display screen, and the vehicle navigation device is running a navigation application. The vehicle navigation device displays road information in the current area on its liquid crystal display screen, wherein the roads include lanes, and the lanes are represented by atomic lanes. In addition, the vehicle navigation device also displays lane association information related to these atomic lanes on its liquid crystal display screen, for example, when a vehicle can be driven from one atomic lane to the other one, it displays a one-way arrow connecting the two atomic lanes, the direction of the arrow being the same as the lane change direction; or when a vehicle can be bidirectionally driven between two atomic lanes, the liquid crystal display screen displays a two-way arrow connecting the two atomic lanes, or displays one-way arrows connecting the two atomic lanes having opposite directions, indicating the lane change direction of the two atomic lanes. As another example, two atomic lanes are naturally connected, the end point of one atomic lane is connected to the start point of the other atomic lane, then the liquid crystal display screen displays a one-way arrow connecting the two atomic lanes, and the direction of the arrow is consistent with the driving direction of the vehicle.

The atomic lanes and the lane association information are used for characterizing the target road. For example, based on the connection information between two atomic lanes physically connected in the same lane, the lane association information related to the two atomic lanes may be determined to be interconnection. That is, a vehicle can be driven from one of the two atomic lanes to the other of the two atomic lanes. Alternatively, in accordance with a driving direction of the lane, the lane association information related to the two atomic lanes may be determined to be a unidirectional connection, the connection direction being consistent with the driving direction of the lane. As another example, when one lane L1 (not shown) intersects the other lane L2 (not shown), the lane L1 is divided into a lane segment L1a (not shown) and a lane segment L1b (not shown) at an intersection, a vehicle can be driven from the lane L2 to the lane segment L1b. Then when atomic lanes are divided, the lane L1 may be segmented at the intersection between the lane L2 and the lane L1, and if the lane L2 and the lane segment L1b are already atomic lanes, the lane association information related to the atomic lane L2 and the atomic lane L1b may be a unidirectional connection, the connection direction being from the atomic lane L2 to the atomic lane L1b. As another example, based on the lane change information related to the two parallel and adjacent atomic lanes, the lane association information related to the two atomic lanes may be determined to be a corresponding lane change relation, in which if the two atomic lanes can be changed with each other, the lane association information related to them is interconnection, that is, a vehicle can be driven from one to the other in the two atomic lanes. Alternatively, based on the traffic rules, only one lane can be changed between the two atomic lanes, then the lane association information related to them may be a unidirectional connection, and the connection direction is consistent with the allowed lane change direction.

Figure 13:
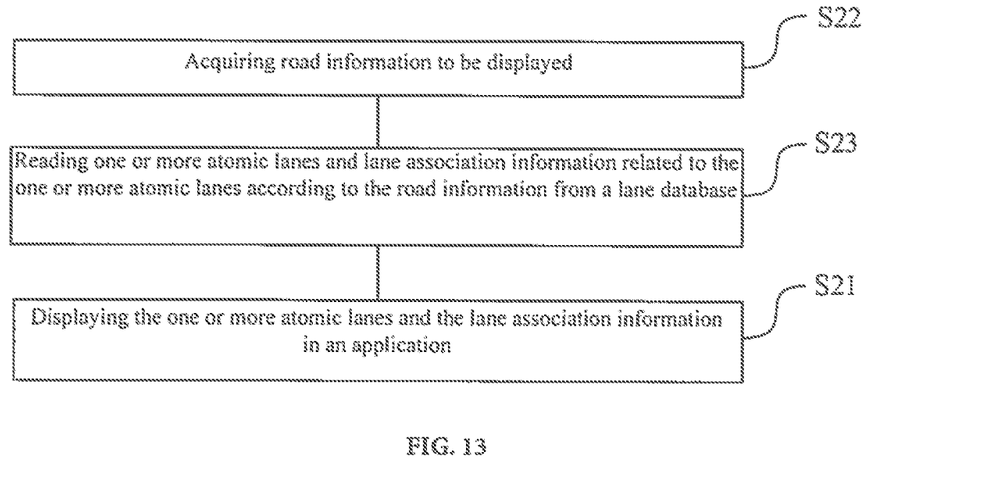

Preferably, referring to FIG. 13, the method may further include step S22 and step S23. In step S22, the road information displaying device may acquire road information to be displayed. In step S23, the road information displaying device may read one or more atomic lanes and lane association information related to the one or more atomic lanes corresponding to the road information from a lane database. Subsequently, in step S21, the one or more atomic lanes and the lane association information may be added to the road information and displayed together.

For example, the vehicle navigation device may first acquire road information to be displayed, wherein the road information to be displayed may correspond to all roads in the target area, or a part thereof, such as a planned path of a navigation application or roads corresponding to a user-specified path. According to the road information to be displayed, the vehicle navigation device may access the lane database, and may acquire one or more atomic lanes corresponding to the corresponding roads, and lane association information related to the atomic lanes (for example, connectivity information or lane change information related to the atomic lanes). The lane database may reside locally in the vehicle navigation device and may include atomic lane information obtained by segmenting lanes in advance, and lane association information related to the atomic lanes. The lane database may also reside in a cloud, and the vehicle navigation device accesses the lane database in the cloud server to acquire atomic lane information corresponding to the road information to be displayed and lane association information related to the atomic lanes. The vehicle navigation device may add the atomic lane information and the lane association information to the road information to be displayed, and may display them together through the liquid crystal display screen, thereby clearly displaying the connectivity of the relevant lanes and the feasibility of lane changes between the lanes.

The road information displaying device is a computing device, e.g., a mobile phone, a tablet computer, a vehicle navigation device, a PDA, a personal computer, etc., and includes a processor and a memory, wherein the memory stores computer-executable instructions, and the processor executes the above method for displaying road information when the executable instructions are executed. Of course, those skilled in the art could understand that the above-mentioned device is only exemplary, and other existing or future possible computing device that may be applicable to the present application shall fall into the scope of the present application and is hereby incorporated by reference. For example, a navigation application is operated on a tablet computer, the tablet computer displays road information in the current area through its display panel, wherein the roads include lanes, and the lanes are represented by atomic lanes; the tablet computer also displays lane association information related to the atomic lanes through its display panel.

According to one aspect of the present application, provided is a road characterization device, comprising:

a processor; and a memory arranged to store computer-executable instructions, wherein when the executable instructions are executed, the processor executes the following operation: acquiring a target road, wherein the target road comprises one or more road segments; determining one or more atomic lanes corresponding to the one or more road segments according to the road segment attribute information of the road segments; and determining lane association information related to the one or more atomic lanes, wherein the one or more atomic lanes and the lane association information are used for characterizing the target road.

Figure 14:
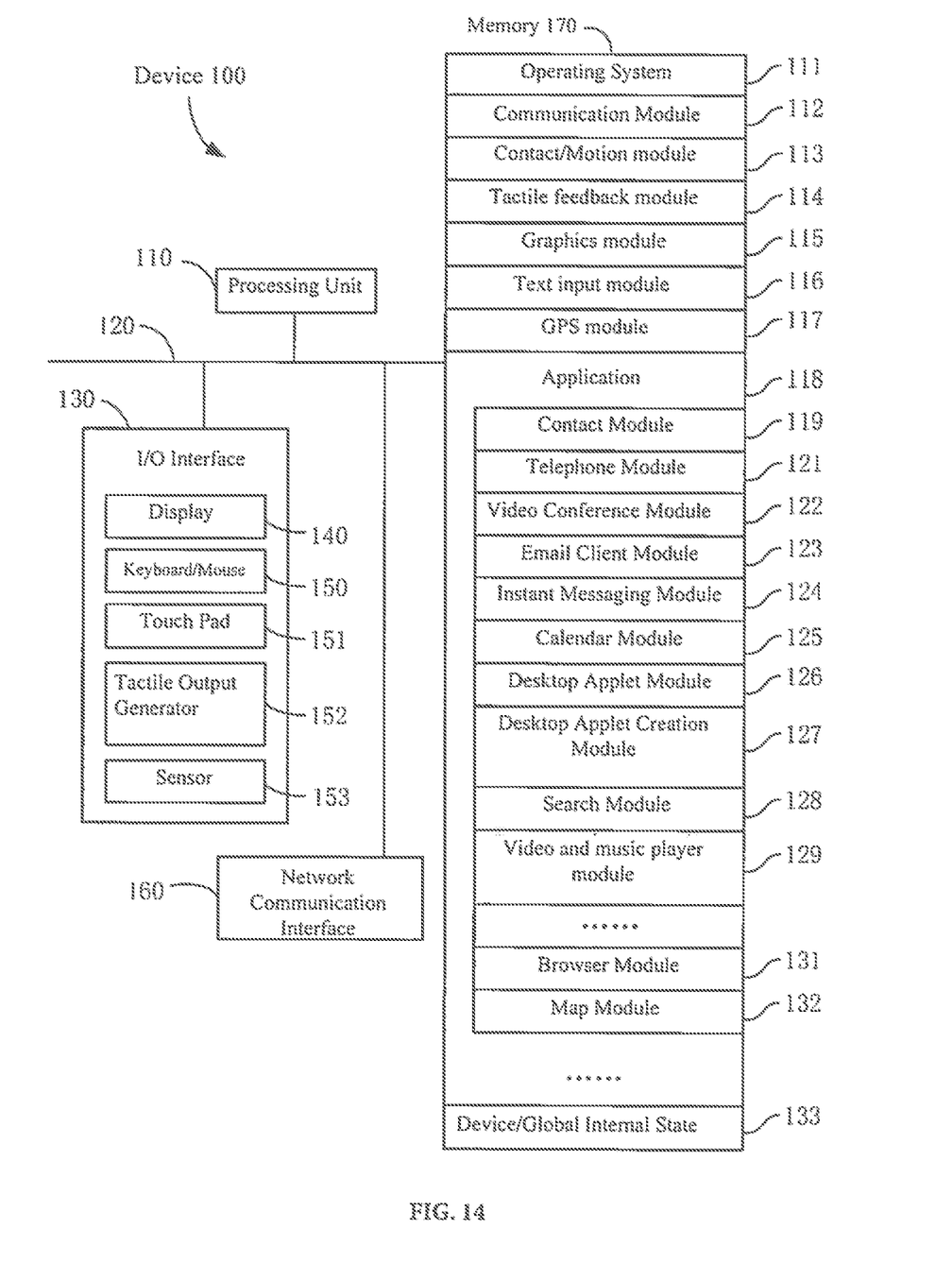
FIG. 14 shows a block diagram of an exemplary road characterization device according to some embodiments of the present application.

FIG. 14 shows a block diagram of an exemplary road characterization device 100 according to some embodiments of the present application. The operations of the road characterization method described above (for example, as shown in FIG. 3, FIG. 5, and FIG. 11) may be executed by the road characterization device 100. In the road characterization method, some operations may be optionally combined and/or the order of some operations may be optionally changed.

In some embodiments, the road characterization device 100 may be a laptop computer, a desktop computer, a tablet computer, a multimedia player device, a mobile terminal, a navigation device, an educational device (e.g., a children's learning toy), a game system or a control device (e.g., a household or industrial controller). The road characterization device 100 may include one or more central processing units (CPUs) 110, one or more network communication interfaces 160 or other communication interfaces, a memory 170, and one or more communication buses 120 for interconnecting these components. The communication bus may optionally include a circuit (sometimes called a chipset) that interconnects system components and controls the communication between the system components. The road characterization device 100 further includes an I/O (Input/Output) interface 130 that includes a display 140, and the display 140 optionally uses an LCD (Liquid Crystal Display) technology, an LPD (Luminescent Polymer Display) technology, or an LED (Light Emitting Diode) technology. In addition, the I/O interface optionally includes a keyboard and/or a mouse 150, a touchpad 151, a tactile output generator 152 for generating a tactile output on the road characterization device 100, and a sensor 153 (for example, an optical sensor, an acceleration sensor, a proximity sensor, a touch-sensitive sensor). The memory 170 may include a high-speed random access memory, such as DRAM, SRAM, DDR RAM or other random access solid-state memory devices, and may optionally include a nonvolatile memory, such as one or more magnetic disk storage devices, optical disk storage devices, flash memory devices or other non-volatile solid-state storage devices. Moreover, the road characterization device may 100 further optionally include a power system for supplying power to various components, one or more optical sensors, one or more proximity sensors, a magnetometer, a GPS (or GLONASS or another global positioning system) receiver, and/or one or more accelerometers.

In some embodiments, the software components stored in the memory 170 may include an operating system 111, a communication module (or an instruction set) 112, a contact/motion module (or an instruction set) 113 for detecting touch operations, a tactile feedback module (or an instruction set) 114 for providing corresponding tactile feedbacks to a user during user's operations, a graphics module (or an instruction set) 115 for rendering and displaying graphics on the display 140 or other display, a text input module (or an instruction set) 116 for the user to input texts in various applications, a GPS (Global Positioning System) module (or an instruction set) 117 for determining a device location and providing the information for use in various applications, and an application (or an instruction set) 118.

The application 118 may optionally include the following modules (or instruction sets) or subsets or supersets thereof:
- a contact module (or a contact list or an address book) 119;
- a telephone module 121;
- a video conference module 122;
- an email client module 123;
- an instant messaging transmission module 124;
- a calendar module 125;
- a desktop applet module 126, optionally including at least one of the following: a weather desktop applet, a stock desktop applet, a calculator desktop applet, an alarm desktop applet, a dictionary desktop applet, other desktop applets acquired or created by a user;
- a desktop applet creation module 127 for creating desktop applets;
- a search module 128;
- a video and music player module 129, optionally composed of a video player module and a music player module;
- a browser module 131;
- a map module 132.

Moreover, in some embodiments, the memory 170 may store a device/global internal state 133 that may include one or more of the following: an activated application state indicating which application or applications (if any) are currently activated; a display state indicating that applications, views or other information occupy various areas of the display 140; a sensor state including information acquired from various sensors of the device and other input or control devices; and a state that a location of the device and/or a location of a posture and/or positioning information are used by an event classifier to determine which application or applications are currently activated. Of course, it could be appreciated by those skilled in the art that the road characterization device 100 described above is only an example, and the road characterization device 100 may have more or fewer components than the components shown in FIG. 14, optionally combine two or more components, or optionally have different configurations or arrangements of these components; and other existing or future possible device that may be applicable to the present application shall fall into the scope of the present application and is hereby incorporated by reference.

According to another aspect of the present application, a device for displaying road information is provided, the device comprising:
- a processor; and a memory arranged to store computer-executable instructions, wherein when the executable instructions are executed, the processor executes the following operation: displaying road information in an application; wherein the road information comprises one or more atomic lanes and lane association information related to the one or more atomic lanes.

The example device for displaying road information according to some embodiments of the present application is the same as or similar to the road characterization device described above, and may refer to the block diagram of the road characterization device shown in FIG. 11, and details are not described but incorporated by reference here. The operations of the above-described method for displaying road information (for example, as shown in FIG. 12 or 13) can be executed by the device for displaying road information, and in the method for displaying road information, some operations are optionally combined and/or the order of some operations is optionally changed.

According to one aspect of the present application, a computer readable medium comprising instructions is provided, wherein when the instructions are executed, the system performs the following operations: acquiring a target road, wherein the target road comprises one or more road segments; determining, according to road segment attribute information of the road segments, one or more atomic lanes corresponding to the one or more road segments; and determining lane association information related to the one or more atomic lanes; wherein the one or more atomic lanes and the lane association information are used for characterizing the target road.

According to another aspect of the present application, provided is a computer readable medium comprising instructions, wherein when the instructions are executed, the system performs the following operation: displaying road information in an application; wherein the road information comprises one or more atomic lanes and lane association information related to the one or more atomic lanes.

It should be noted that the present application can be implemented by software and/or a combination of software and hardware, for example, implemented using an application-specific integrated circuit (ASIC), a general-purpose computer, or any other similar hardware device. In one embodiment, the software program of the present application can be executed by a processor to implement the steps or functions described above. Similarly, the software program (including relevant data structures) of the present application can be stored in a computer readable recording medium, such as an RAM, a magnetic or optical drive or a floppy disk and the like. In addition, some steps or functions of the present application may be implemented by hardware, such as a circuit that cooperates with the processor to perform various steps or functions.

Moreover, part of the present application can be applied as a computer program product, such as computer program instructions, which, when executed by a computer, can invoke or provide a method and/or solution according to the present application through the operation of the computer. It should be understood by those skilled in the art that the form of the computer program instructions in the computer readable medium includes, but is not limited to, source files, executable files, installation package files, etc., accordingly, the manner in which the computer program instructions are executed by the computer includes but is not limited to: the computer directly executes the instructions, or the computer compiles the instructions and then executes the corresponding compiled program, or the computer reads and executes the instructions, or the computer reads and installs the instructions and then executes the corresponding post-installation program. Here, the computer readable medium may be any available computer readable storage medium or communication medium that is accessible to a computer.

The communication media may include media for transmitting communication signals of, for example, computer readable instructions, data structures, program modules or other data from one system to the other system. The communication media may include conductive transmission media (such as cables and wires (e.g., optical fibers, coaxial, etc.)) and wireless (non-conductive transmission) media capable of propagating energy waves, such as sound, electromagnetic, RF, microwaves and infrared. The computer readable instructions, data structures, program modules or other data may be embodied, for example, as modulated data signals in wireless media (such as carriers or a similar mechanism embodied in a part of a spread spectrum technology. The term "modulated data signals" refer to signals of which one or more features are altered or set by coding information in the signals. The modulation may be analog, digital or hybrid modulation technology.

As an example but not a limitation, the computer readable storage media may include volatile and nonvolatile, mobile and immobile media implemented by any method or technology for storing information of computer readable instructions, data structures, program modules or other data. For example, the computer readable storage media include, but are not limited to, volatile memories such as random access memories (RAM, DRAM, SRAM); nonvolatile memories such as flash memories, various read-only memories (ROM, PROM, EPROM, EEPROM), magnetic and ferromagnetic/ferroelectric memories (MRAM, FeRAM); magnetic and optical storage devices (hard disks, magnetic tapes, CDs, DVDs); or other currently known media or future developed media capable of storing computer readable information/data used by computer systems.

Herein, a device is included according to an embodiment of the present application, and the device includes a memory for storing computer program instructions and a processor for executing the program instructions, wherein when the computer program instructions are executed by the processor, the device is triggered to operate the aforementioned methods and/or technical solutions according to multiple embodiments of the present application.

It is obvious to those skilled in the art that the present application is not limited to the details of the above exemplary embodiments, and the present application can be implemented in other specific forms without departing from the spirit or essential characteristics of the present application. Therefore, the embodiments are considered as illustrative but not restrictive at any point, and the scope of the present application is defined by the appended claims instead of the above description. Accordingly, all variations intended to fall within the meanings and scope of equivalent elements of the claims are included in the present application. Any reference signs in the claims should not be construed as limiting the claims. Obviously, the term "include" does not exclude other elements or steps, and the singular does not exclude the plural. The plurality of units or devices described in the device claims may also be implemented by a unit or device through software or hardware. The first, second and the like are used to denote names, but do not denote any particular order.

What is claimed is:

1. A road characterization method, comprising:
   acquiring a target road, wherein the target road comprises one or more road segments;
   determining, according to road segment attribute information of the road segments, one or more atomic lanes corresponding to the road segments;
   determining lane association information related to the atomic lanes corresponding to the target road, wherein the one or more atomic lanes and the lane association information are used for characterizing the target road; and
   constructing, according to the one or more atomic lanes and the lane association information, a directed graph corresponding to the target road, wherein each vertex in the directed graph corresponds to one of the atomic lanes, and wherein a directed edge between two vertices in the directed graph corresponds to the lane association information related to the two atomic lanes.

2. The method according to claim 1, wherein determining the lane association information related to the atomic lanes corresponding to the target road comprises:
   determining the lane association information related to the atomic lanes corresponding to the target road according to a preset lane association rule.

3. The method according to claim 2, wherein the lane association rule comprises at least one of the following:
   if a first atomic lane and a second atomic lane of the atomic lanes corresponding to the target road belong to the same road segment, and a lane change can be made from the first atomic lane to the second atomic lane, the lane association information related to the first atomic lane and the second atomic lane is determined to include that the lane change can be made from the first atomic lane to the second atomic lane;
   if a third atomic lane and a fourth atomic lane of the atomic lanes corresponding to the target road belong to adjacent road segments, and a vehicle can be driven from the third atomic lane to the fourth atomic lane, the lane association information related to the third atomic lane and the fourth atomic lane is determined to include that an end point of the third atomic lane is connected to a start point of the fourth atomic lane; or
   if a fifth atomic lane and a sixth atomic lane of the atomic lanes corresponding to the target road belong to the same road segment, and an end point of the fifth atomic lane coincides with a start point of the sixth atomic lane, the lane association information related to the fifth atomic lane and the sixth atomic lane is determined to include that the end point of the fifth atomic lane is connected to the start point of the sixth atomic lane.

4. The method according to claim 1, wherein each of the atomic lanes has a unique start point and a unique end point.

5. The method according to claim 4, wherein each point on each of the atomic lanes has the same lane change activity.

6. The method according to claim 1, further comprising:
   determining lane assistance information of the atomic lanes according to the road segment attribute information of the road segments of the atomic lanes.

7. The method according to claim 6, wherein the lane assistance information comprises at least one of:
   speed limit information of the atomic lanes;
   traffic control information of the atomic lanes;
   curvature information of the atomic lanes;
   road surface information of the atomic lanes; or environmental information of the atomic lanes.

8. The method according to claim 1, wherein the target road comprises at least one of:
   a plurality of roads within a target area;
   a planned path output by a planning application; or
   a driving path set by a user.

9. The method of claim 1, further comprising:
   displaying road information in an application, wherein the road information comprises the one or more atomic lanes and the lane association information related to the one or more atomic lanes.

10. The method according to claim 9, further comprising:
    acquiring the road information to be displayed; and
    reading the one or more atomic lanes and the lane association information related to the one or more atomic lanes according to the road information from a lane database;
    wherein displaying the road information in the application comprises:
    displaying the one or more atomic lanes and the lane association information in the application.

11. A system, comprising:
a processor; and
a memory arranged to store computer-executable instructions, wherein when the computer-executable instructions are executed, the processor executes operations comprising:
  acquiring a target road, wherein the target road comprises one or more road segments;
  determining, according to road segment attribute information of the road segments, one or more atomic lanes corresponding to the road segments;
  determining lane association information related to the atomic lanes corresponding to the target road, wherein the one or more atomic lanes and the lane association information are used for characterizing the target road; and
  constructing, according to the one or more atomic lanes and the lane association information, a directed graph corresponding to the target road, wherein each vertex in the directed graph corresponds to one of the atomic lanes, and wherein a directed edge between two vertices in the directed graph corresponds to the lane association information related to the two atomic lanes.

12. The system of claim 11, wherein when the computer-executable instructions are executed, the processor is further to:
  display road information in an application, wherein the road information comprises the one or more atomic lanes and the lane association information related to the one or more atomic lanes.

13. The system of claim 12, wherein when the computer-executable instructions are executed, the processor is further to:
  acquire the road information to be displayed; and
  reading the one or more atomic lanes and the lane association information related to the one or more atomic lanes according to the road information from a lane database.

14. The system to claim 11, wherein determining the lane association information related to the atomic lanes corresponding to the target road comprises:
  determining the lane association information related to the atomic lanes corresponding to the target road according to a preset lane association rule.

15. The system of claim 14, wherein the lane association rule comprises at least one of the following:
  if a first atomic lane and a second atomic lane of the atomic lanes corresponding to the target road belong to the same road segment, and a lane change can be made from the first atomic lane to the second atomic lane, the lane association information related to the first atomic lane and the second atomic lane is determined to include that the lane change can be made from the first atomic lane to the second atomic lane;
  if a third atomic lane and a fourth atomic lane of the atomic lanes corresponding to the target road belong to adjacent road segments, and a vehicle can be driven from the third atomic lane to the fourth atomic lane, the lane association information related to the third atomic lane and the fourth atomic lane is determined to include that an end point of the third atomic lane is connected to a start point of the fourth atomic lane; or
  if a fifth atomic lane and a sixth atomic lane of the atomic lanes corresponding to the target road belong to the same road segment, and an end point of the fifth atomic lane coincides with a start point of the sixth atomic lane, the lane association information related to the fifth atomic lane and the sixth atomic lane is determined to include that the end point of the fifth atomic lane is connected to the start point of the sixth atomic lane.

16. The system of claim 11, wherein each of the atomic lanes has a unique start point and a unique end point.

17. The system of claim 11, wherein when the computer-executable instructions are executed, the processor is further to:
  determine lane assistance information of the atomic lanes according to the road segment attribute information of the road segments of the atomic lanes.

18. The system of claim 17, wherein the lane assistance information comprises at least one of:
  speed limit information of the atomic lanes;
  traffic control information of the atomic lanes;
  curvature information of the atomic lanes;
  road surface information of the atomic lanes; or
  environmental information of the atomic lanes.

19. The system of claim 11, wherein the target road comprises at least one of:
  a plurality of roads within a target area;
  a planned path output by a planning application; or
  a driving path set by a user.

20. A non-transitory computer-readable medium comprising instructions that, when accessed by a processor, cause the processor to:
  acquire a target road, wherein the target road comprises one or more road segments;
  determine, according to road segment attribute information of the road segments, one or more atomic lanes corresponding to the road segments;
  determine lane association information related to the atomic lanes corresponding to the target road, wherein the one or more atomic lanes and the lane association information are used for characterizing the target road; and
  construct, according to the one or more atomic lanes and the lane association information, a directed graph corresponding to the target road, wherein each vertex in the directed graph corresponds to one of the atomic lanes, and wherein a directed edge between two vertices in the directed graph corresponds to the lane association information related to the two atomic lanes.

* * * * *